United States Patent [19]
Hiben et al.

[11] Patent Number: 5,323,125
[45] Date of Patent: Jun. 21, 1994

[54] FREQUENCY AGILE METHOD FOR TRANSMITTING MULTI-LEVEL DATA

[75] Inventors: Bradley M. Hiben, Glen Ellyn; Peter Nanni, Algonquin, both of Ill.

[73] Assignee: Motorola, Inc., Schaumburg, Ill.

[21] Appl. No.: 31,786

[22] Filed: Mar. 15, 1993

[51] Int. Cl.$^5$ ............................. H03C 3/00; H03L 7/16
[52] U.S. Cl. ....................................... 332/100; 375/48; 375/62; 331/18; 331/23
[58] Field of Search ................. 332/100, 102, 103, 104, 332/105; 331/1 A, 18, 23; 375/17, 18, 19, 45, 46, 47, 48, 49, 50, 51, 52, 53, 54, 55, 56, 57, 62, 63, 64, 65, 66, 67, 120

[56] References Cited

U.S. PATENT DOCUMENTS

| | | | |
|---|---|---|---|
| 3,958,191 | 5/1976 | Jones, Jr. ................ | 332/100 X |
| 4,471,328 | 9/1984 | Chapman ................ | 332/112 |
| 4,755,774 | 7/1988 | Heck ...................... | 455/113 X |
| 5,028,887 | 7/1991 | Gilmore .................. | 331/18 |
| 5,053,728 | 10/1991 | Bogl ...................... | 375/65 X |
| 5,130,676 | 7/1992 | Mutz ..................... | 332/100 |
| 5,289,141 | 2/1994 | Nanni et al. ............ | 331/23 X |

FOREIGN PATENT DOCUMENTS 0051310 4/1979 Japan ............................. 332/100

OTHER PUBLICATIONS

IEEE Trans. on Communications. *The Duobinary Technique for High-Speed Data Transmission* Author: A. Lender Electronics, vol. 82, May, 1963 pp. 214-218.

*Primary Examiner*—David Mis
*Attorney, Agent, or Firm*—James A. Coffing

[57] ABSTRACT

A data transmitter (100) operating at a transmit frequency provides a modulated data signal (114) by adjusting a reference frequency signal (108). The method of modulating an N-level data signal (102) inputted to the transmitter (100) provides for inputting, to a signal processor (201), a frequency deviation value. Using the frequency deviation value, the signal processor (201) then determines a maximum rate of enabling the frequency adjustment. Further, a deviation ratio corresponding to one of the N-levels is determined, and an increment value is then calculated (302) using this deviation ratio. Lastly, the frequency adjustment is enabled (312, 320) using the calculated increment value.

27 Claims, 2 Drawing Sheets

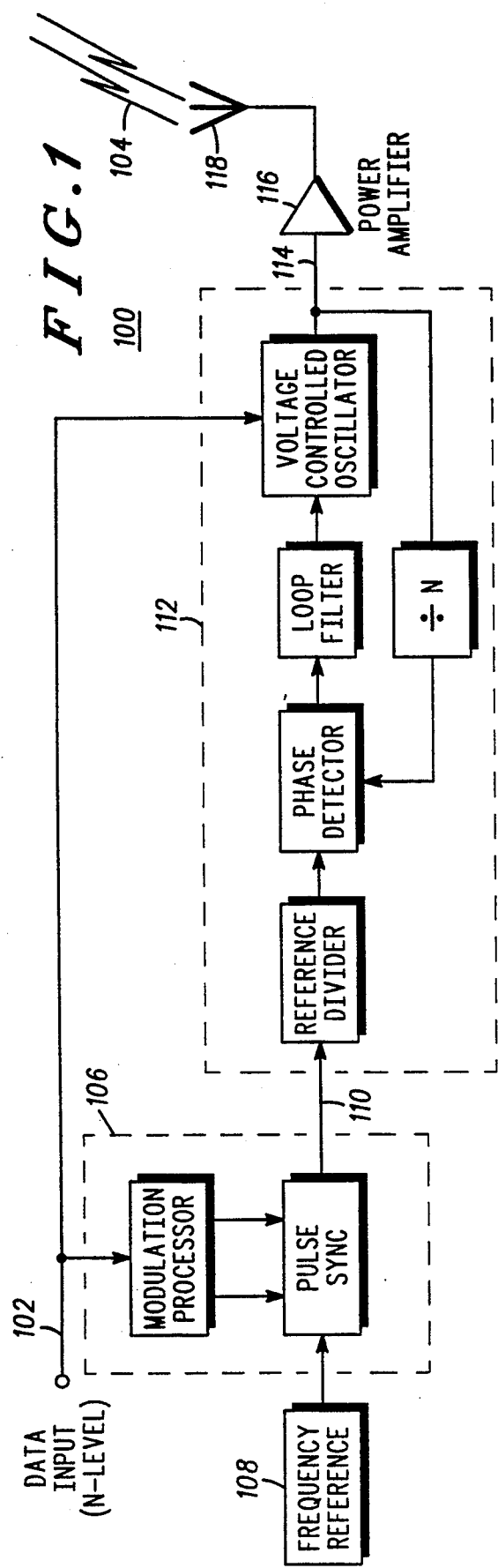
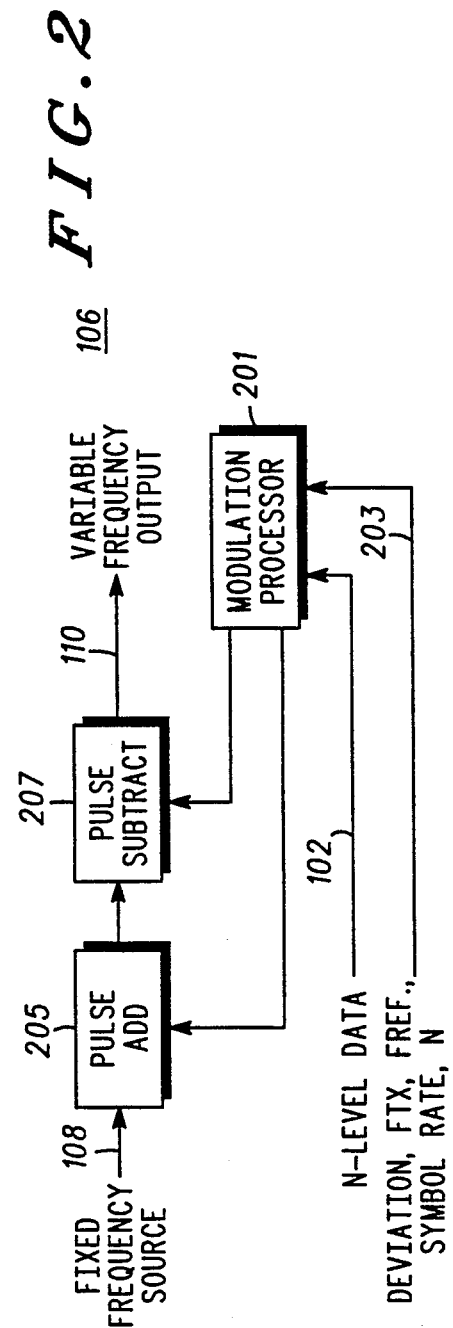

FREQUENCY AGILE METHOD FOR TRANSMITTING MULTI-LEVEL DATA

FIELD OF THE INVENTION

The present invention relates generally to data transmission systems, and in particular to such systems that employ phase locked loop frequency modulation circuits. Consideration is given to such circuits that provide for modulation of data signals having a D.C. frequency component.

BACKGROUND OF THE INVENTION

Data transmission systems are well known in the communications art. Such systems typically employ a frequency synthesizer circuit (e.g., phase lock loop circuit) for generating a carrier signal, a modulation circuit for modulating the incoming data about the carrier signal, and a power amplifier for boosting the power level of the modulated data signal for transmission. One modulation scheme often employed, frequency shift keying (FSK), provides a modulated signal by altering the frequency of a carrier signal. That is, by changing a predetermined carrier frequency signal by a known amount depending on the value of the incoming data, a signal is provided that can be easily demodulated at the receiving end to reconstruct the original data signal. Thus, FSK is a frequency modulation (FM) technique. It should be noted that the use of phase locked loop (PLL) circuits to generate frequency modulation information on a radio carrier frequency is well known in the art. Such systems are particularly useful in situations where both accurate frequency control and frequency agility are required.

The requirements of accuracy and agility are satisfied by the PLL for signals with an average value of zero, such as a signal produced at the terminals of a microphone. However, in the case of non-return to zero (NRZ) data information, the average value of the signal is not necessarily zero. The PLL will remove the frequency components of the data signal that fall below a particular frequency threshold, which is determined by the construction of the PLL. In principle, this frequency threshold can be made arbitrarily low, but in practice the problems that arise in the physical hardware implementation of a PLL that modulates low frequencies are prohibitive.

A solution to this problem for binary data applications was disclosed in U.S. Pat. No. 4,471,328, entitled "Variable Frequency Reference Source Responsive to Digital Data", incorporated herein by reference. The patent provides, in part, for modification of the reference frequency by adding pulses to, or subtracting pulses from, the signal produced by the fixed frequency source (reference no. 10 in the reference) prior to introduction to a phase locked loop (PLL) circuit. The rate of pulse addition or subtraction is determined by the data signal that is to be modulated (18 in FIG. 1) and the frequency of an oscillator (26 in FIG. 1 ). By adjusting the frequency of the oscillator, the proper FM deviation can be obtained for a given transmitter carrier frequency.

While this technique provides modulation of frequency components down to 0 Hz, it is cumbersome to use because the oscillator frequency must be adjusted for each transmitter carrier frequency and transmitter deviation. Also, to expand the technique to multi-level data signals, e.g., four-level data, would require additional dividers (28 and 30 in FIG. 1) and oscillators (26 in FIG. 1), additional multiplexing circuitry (20, 22, and 24 in FIG. 1) and additional inputs capable of handling multi-level input (note that data input 18 is for binary data exclusively). Therefore, the attendant increase in circuit complexity, cost, and maintenance (i.e., adjustment) becomes prohibitive utilizing the prior art.

Additionally, systems utilizing analog hardware, such as that disclosed in U.S. Pat. No. 4,755,744, entitled "Two Port Synthesizer Modulation System Employing an Improved Reference Phase Modulator", also exist. These systems suffer, however, from the disadvantages of performance variation over temperature, manufacturing tolerance, aging, and other impacts.

Accordingly, there exists a need for a data transmission system transmitter which is not subject to the constraints of the prior art. In particular, a data transmitter that is operable over a variable frequency range without manual adjustment, and is responsive to multi-level data inputs without sensitivity to temperature, aging, and manufacturing tolerance would be an improvement over the existing art. That is, by providing a synchronized, virtually temperature independent modulation scheme, an agile data transmitter would be provided that avoids the short-comings of todays data transmitters.

BRIEF DESCRIPTION OF THE DRAWINGS

FIG. 1 shows a simplified block diagram of a data transmission system, in accordance with the present invention;

FIG. 2 shows a data flow diagram depicting one of the functional components shown in FIG. 1.

DETAILED DESCRIPTION OF THE PREFERRED EMBODIMENT

Figure 3:
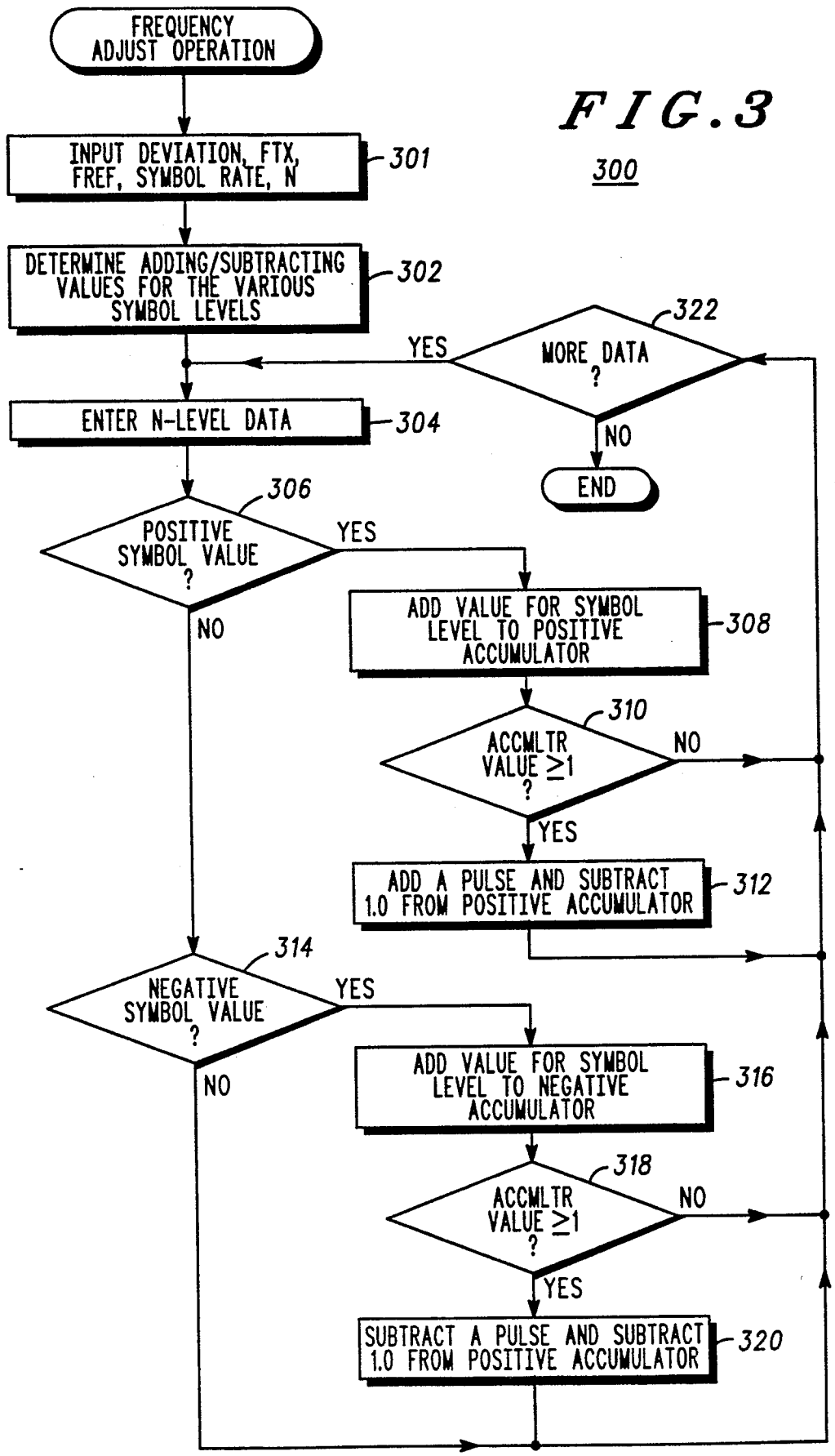
FIG. 3 shows a flow diagram depicting the frequency adjust operation, in accordance with the invention.

The present invention encompasses a data transmitter that employs a digital signal process by which pulses are added to and subtracted from a fixed frequency reference signal. Because the implementation is digital, varying inputs can be provided to the signal processor to effect a variety of characteristics that define the modulation process. That is, a signal modulation processor can be used to process a wide range of multi-level data input signals over a wide range of transmit frequencies. Further, this modulation can be accomplished using a range of frequency deviation values and at varying symbol rates. Accordingly, an agile data transmitter is provided that can be easily configured to accommodate a multiplicity of operating requirements.

FIG. 1 shows a data transmission system 100 which operates to transmit data signal 102 as a modulated wave form 104. A signal processing circuit 106 is used to frequency adjust a reference frequency signal 108 according to a predetermined modulation scheme. Modulated reference signal 110 is inputted to a phase lock loop synthesizer 112, which synthesizer is well known in the art. Modulated RF carrier signal 114 is then amplified by power amplifier 116 and transmitted via antenna 118. It should be noted that the fixed reference frequency source might be a standard crystal oscillator such as Motorola part number KXN1096A, or other suitable frequency control device. Further, the reference divider, phase detector, and loop divider (i.e., divide-by-N circuit) shown in FIG. 1 can be embodied using integrated circuitry such as a Motorola MC145170 frequency synthesizer IC. Lastly, the voltage controlled oscillator (VCO) might be embodied using a Motorola part number TTD1732A.

FIG. 2 shows a more detailed view of signal processor 106, which depicts the processing steps performed on the signals shown in FIG. 1. In particular, modulation signal processor 201 receives as inputs the N-level data stream 102 as well as the plurality of system inputs 203. Modulation processor 201 may be embodied using a digital signal processor, such as Motorola part number MC56001, a microprocessor such as Motorola part number MC68030, or any other suitable signal processor. Utilizing these inputs, modulation signal processor 201 determines when to add and subtract pulses from the reference frequency signal. That is, when modulation signal processor 201 determines that a pulse is to be added to reference frequency signal 108, pulse adder 205 is enabled. Likewise, when modulation signal processor 201 determines that a pulse should be removed from reference frequency signal 108, pulse subtracter 207 is enabled. Accordingly, variable frequency output 110 is provided, which is then inputted to phase lock loop synthesizer 112 shown in FIG. 1.

FIG. 3 shows a flow diagram 300 depicting the frequency adjust operation embodied in signal processor 106 shown in FIG. 1. Implementing the following algorithm requires that system parameters 203 (i.e., frequency deviation ($F_{dev}$), transmit frequency ($F_{Tx}$), reference frequency (i.e., frequency of the fixed frequency reference source, $F_{ref}$), symbol rate, and the number of levels, N, in the multilevel signal) be input (301) to modulation processor 201. Modulation processor 201 then determines (302) the number of pulses to be added to, or subtracted from, the reference frequency for the particular N-level data sequence to be modulated. This is accomplished using a series of computations performed on the system parameters 203 and N-level data signal 102, shown in FIG. 2. Equation 1 shows the calculation performed using the frequency deviation value and the transmit and reference frequencies:

$$M_{max} = \frac{F_{dev}}{F_{Tx}/F_{ref}} \quad (1)$$

In particular, $M_{max}$ represents a maximum number of pulse additions/subtractions which can be imparted on the reference frequency signal in a predetermined period of time (e.g., 1 second).

Equation 2 serves to determine the corresponding maximum increment rate ($R_{max}$), which rate is a function of the maximum add/subtract rate ($M_{max}$), and the rate at which the incoming symbols are being presented to the transmitter. It should be noted that $M_{max}$ and $R_{max}$ represent a rate of enabling the circuitry that alters the reference frequency signal, in accordance with the invention.

$$R_{max} = \frac{M_{max}}{\text{Symbol Rate}} \quad (2)$$

Next, a deviation ratio ($V_j$) is determined for each of the multi-level symbols. $V_j$ is a function of an index variable, k, and the number of data levels, N, and represents a ratio by which the peak deviation is divided and assigned to each of the N symbol values. For example, if N=4, there are effectively four distinct carrier deviation ratios—$\pm\frac{1}{3}$ and $\pm 1$ (i.e., each ratio—$\frac{1}{3}$ and 1—being applied to values placed in both the positive and negative accumulators, as later described). Formulas for an arbitrary N-level data signal are shown in equations 3 and 4:

$$V_j = \frac{k}{(N-1)} ; k = 1, 3, 5, \ldots, N-1; N \text{ even} \quad (3)$$

$$V_j = \frac{k}{(N-1)} ; k = 0, 2, 4, \ldots, N-1; N \text{ odd} \quad (4)$$

Finally, increment value $V_i$ can be computed according to equation 5;

$$V_i = V_j \times R_{max} \quad (5)$$

That is, the value that will be added to the accumulators (as later described) are, in a preferred embodiment, a fraction of the total possible rate of adjustment represented by $R_{max}$.

To illustrate the invention by way of example, let:
Transmit frequency ($F_{Tx}$)=150 MHz
Reference frequency ($F_{ref}$)=16.8 MHz
Peak deviation value ($F_{dev}$)=5 kHz
Symbol rate=2400 bps
N=3

This system is referred to as a duo-binary system, where the applicable symbol values are −1, 0, and +1. [For a detailed description of the duo-binary system, see A. Lender, "The Duobinary Technique for High-Speed Data Transmission," IEEE Trans. on Communications. Electronics, Vol. 82, pp. 214–218, May, 1963].

According to the present invention, $M_{max}$ represents the maximum rate that pulses can be added to or subtracted from the fixed frequency reference signal to obtain the system peak deviation, 5 kHz in this case. In this example, if the symbol value +1 were transmitted continuously, pulses would have to be added to the fixed frequency reference signal at this rate to obtain a carrier deviation of +5 kHz. In this example, equations 1 and 2 yield:
$M_{max}$=560 pulses/second; and
$R_{max}$=0.23333 pulses/symbol The values for $V_j$ are determined from equation 4, since N is odd. In this example, the k values are 0, 2. Accordingly, equations 4 and 5 yield:
$V_j$=1, 0, 1(for symbols −1, 0, +1, respectively); and
$V_i$=0.2333, 0, 0.2333 (for symbols −1, 0, +1)

If the symbol to be transmitted is a +1, the value 0.23333 will be added to the positive accumulator. If this causes the positive accumulator value to be greater than or equal to one, the value one is subtracted from the accumulator, and a pulse is added to the reference frequency signal. If the symbol to be transmitted is a negative one, the value 0.23333 will be added to the negative accumulator. If this causes the accumulator value to be greater than or equal to one, the value one is subtracted from the negative accumulator, and a pulse is subtracted from the reference frequency signal. Lastly, if the symbol to be transmitted is a zero, neither accumulator is incremented, and the reference frequency signal is not modified. The foregoing process continues throughout the data transmission, until all of the data has been transmitted.

Turning back to FIG. 3, the N-level data stream is entered (i.e., inputted from an upstream data generation process), and the modulation process begins. In a preferred embodiment, a pair of accumulators are used to determine precisely when the reference frequency signal is to be adjusted, or altered. After entry (304) of the N-level data stream, a decision (306) is reached that determines whether or not the received symbol has a positive value. If a positive value is detected, the increment value of the symbol to be transmitted, $V_i$, is added (308) to the positive accumulator. The positive accumulator is then tested (310) to determine whether or not a predetermined value (in a preferred embodiment, this value is equal to 1 pursuant to the example given above) has been exceeded. If the accumulator exceeds the predetermined value, a pulse is added to the reference frequency and the predetermined value is subtracted (312) from the the positive accumulator. In either case, a decision (322) is reached to determine whether there is more data to be transmitted. If there is more data, the routine returns to enter (304) subsequent data symbols, otherwise the routine is exited.

Likewise, if a negative symbol value is detected (314), the increment value corresponding to that symbol is added (316) to the negative accumulator, and a similar test is performed on that accumulator (318). When the negative accumulator exceeds a predetermined value (also '1' in a preferred embodiment), a pulse is subtracted from the reference frequency signal and the predetermined value is subtracted (320) from the negative accumulator. In either case, a decision (322) is reached to determine whether there is more data to be transmitted. If there is more data, the routine returns to enter (304) subsequent data symbols, otherwise the routine is exited.

If the symbol value is substantially zero—i.e., fails positive symbol test 306 and negative symbol test 314—neither accumulator is incremented. If there is more data (322), the routine returns to enter (304) subsequent data symbols, otherwise the routine is exited. This last feature allows the instant invention to anticipate modulation of signals having an odd N value (e.g., 3, 5, 7) for transmission without added circuit complexity.

What is claimed is:

1. In a data transmitter that includes a signal processor, a reference frequency signal source that produces a reference frequency signal, and means for adjusting the reference frequency signal, a method for the data transmitter to modulate the reference frequency signal in response to an inputted multiple level data signal, the method comprising steps for:
   A) receiving, by the signal processor, a frequency deviation value and a number of levels in the inputted multiple level data signal;
   B) determining, by the signal processor and based on the number of levels, a deviation ratio corresponding to a first level in the inputted multiple level data signal;
   C) calculating, by the signal processor and based at least in part on the deviation ratio, an increment value; and
   D) enabling, by the signal processor, the adjusting means using the increment value to modulate the reference frequency signal.

2. The method of claim 1, wherein step (D) comprises the step of:
   D1) inputting the increment value to the adjusting means.

3. The method of claim 1, wherein the signal processor includes a first accumulator and wherein step (D) further comprises the step of:
   D1) inputting the increment value to the first accumulator.

4. The method of claim 3, further comprising steps for:
   E) testing, by the signal processor, the first accumulator to determine whether a predetermined value is exceeded; and
   F) subtracting, by the signal processor, the predetermined value from the first accumulator.

5. The method of claim 4, further comprising a step for:
   G) when the predetermined value is exceeded, adding, by the adjusting means, a signal pulse to the reference frequency signal to produce the modulated reference frequency signal.

6. The method of claim 4, further comprising a step for:
   G) when the predetermined value is exceeded, subtracting, by the adjusting means, a signal pulse from the reference frequency signal to produce the modulated reference frequency signal.

7. The method of claim 1, wherein the signal processor includes a first accumulator and wherein step (D) comprises the steps of:
   D1) detecting a negative data value in the first level; and
   D2) inputting to the first accumulator the increment value.

8. The method of claim 7, further comprising steps for:
   E) testing, by the signal processor, the first accumulator to determine whether a predetermined value is exceeded; and
   F) when the predetermined value is exceeded, subtracting, by the signal processor, the predetermined value from the first accumulator.

9. The method of claim 1, wherein the signal processor includes a first accumulator and wherein step (D) comprises steps for:
   D1) detecting a positive data value in the first level; and
   D2) inputting, to the first accumulator, the increment value.

10. The method of claim 9, further comprising steps for:
    E) testing, by the signal processor, the first accumulator to determine whether a predetermined value is exceeded; and
    F) when the predetermined value is exceeded, subtracting, by the signal processor, the predetermined value from the first accumulator.

11. The method of claim 9, wherein the signal processor includes a second accumulator and wherein step (D) further comprises the steps of:
    D3) detecting a negative data value in a second level of the inputted multiple level data signal; and
    D4) inputting, to the second accumulator, an increment value associated with the detected negative data value.

12. The method of claim 11, further comprising steps for:
    E) testing, by the signal processor, the second accumulator to determine whether a predetermined value is exceeded; and
    F) when the predetermined value is exceeded, subtracting, by the signal processor, the predetermined value from the second accumulator.

13. The method of claim 12, further comprising a step for:
   G) adding, by the adjusting means, a signal pulse to the reference frequency signal to produce the modulated reference frequency signal.

14. The method of claim 12, further comprising a step for:
   G) subtracting, by the adjusting means, a signal pulse from the reference frequency signal to produce the modulated reference frequency signal.

15. In a data transmitter that includes a signal processor, a reference frequency signal source that produces a reference frequency signal, and means for adjusting the reference frequency signal, the adjusting means being intermittently enabled by the signal processor, a method for the data transmitter to modulate the reference frequency signal in response to an inputted multiple level data signal, the method comprising steps for:
   A) receiving, by the signal processor, a frequency deviation value and a number of levels in the inputted multiple level data signal;
   B) determining, by the signal processor and based on the number of levels, a deviation ratio corresponding to a first level in the inputted multiple level data signal;
   C) calculating, by the signal processor and based at least in part on the deviation ratio, an increment value; and
   D) inputting, by the signal processor, the increment value to the adjusting means to produce the modulated reference signal.

16. The method of claim 15, wherein the signal processor includes a first accumulator and wherein step (D) comprises the steps of:
   D1) detecting a negative data value in the first level; and
   D2) inputting to the first accumulator the increment value.

17. The method of claim 16, further comprising steps for:
   E) testing, by the signal processor, the first accumulator to determine whether a predetermined value is exceeded; and
   F) when the predetermined value is exceeded, subtracting, by the signal processor, the predetermined value from the first accumulator.

18. The method of claim 15, wherein the signal processor includes a first accumulator and wherein step (D) comprises the steps of:
   D1) detecting a positive data value in the first level; and
   D2) inputting, to the first accumulator, the increment value.

19. The method of claim 18, wherein the signal processor includes a second accumulator and wherein step (D) further comprises the steps of:
   D3) detecting a negative data value in a second level of the inputted multiple level data signal; and
   D4) inputting, to the second accumulator, an increment value associated with the detected negative data value.

20. The method of claim 19, further comprising steps for:
   E) testing, by the signal processor, the first accumulator to determine whether a first predetermined value is exceeded;
   F) when the first predetermined value is exceeded, subtracting, by the signal processor, the first predetermined value from the first accumulator;
   G) testing, by the signal processor, the second accumulator to determine whether a second predetermined value is exceeded; and
   H) when the second predetermined value is exceeded, subtracting, by the signal processor, the second predetermined value from the second accumulator.

21. The method of claim 20, further comprising a step for:
   I) adding, by the adjusting means, a signal pulse to the reference frequency signal to produce the modulated reference frequency signal.

22. The method of claim 20, further comprising a step for:
   I) subtracting, by the adjusting means, a signal pulse from the reference frequency signal to produce the modulated reference frequency signal.

23. In a data transmitter that includes a signal processor, a reference frequency signal source that produces a reference frequency signal, and means for adjusting the reference frequency signal, the adjusting means being intermittently enabled by the signal processor, a method for the data transmitter to modulate the reference frequency signal in response to an inputted multiple level data signal, the method comprising steps for:
   A) receiving, by the signal processor, a frequency deviation value and a number of levels in the inputted multiple level data signal;
   B) determining, by the signal processor, based at least in part on the frequency deviation value and the reference frequency signal, a maximum rate of enabling the adjusting means;
   C) determining, by the signal processor, a deviation ratio corresponding to each level in the inputted multiple level data signal, to produce a plurality of deviation ratios;
   D) calculating, by the signal processor, based at least in part on the maximum rate of enabling, an increment value associated with each level in the inputted multiple level data signal to produce a plurality of increment levels;
   E) detecting, by the signal processor, a data value for each level of the inputted multiple level data signal;
   F) upon detection of a negative data value, inputting to a first accumulator in the signal processor, an increment value associated with the corresponding level that produced the negative data value; and
   G) upon detection of a positive data value, inputting to a second accumulator in the signal processor, an increment value associated with the corresponding level that produced the positive data value.

24. The method of claim 23, further comprising steps for:
   H) testing, by the signal processor, the first accumulator to determine whether a predetermined value is exceeded;
   I) when the predetermined value is exceeded, subtracting, by the signal processor the predetermined value from the first accumulator; and
   J) subtracting, by the adjusting means, a signal pulse from the reference frequency signal to produce the modulated reference frequency signal.

25. The method of claim 23, further comprising steps for:

H) testing, by the signal processor, the second accumulator to determine whether a predetermined value is exceeded; and I) when the predetermined value is exceeded, subtracting, by the signal processor, the predetermined value from the second accumulator; and J) adding, by the adjusting means, a signal pulse to the reference frequency signal to produce the modulated reference frequency signal.

26. The method of claim 23, wherein step D) comprises the step of:

D1) multiplying the maximum rate of enabling with the deviation ratio to produce each increment value.

27. In a data transmitter that includes a signal processor and a reference frequency signal source that produces a reference frequency signal, the signal processor having means for adjusting the reference frequency signal, a method for the signal processor to modulate the reference frequency signal in response to an inputted multiple level data signal, the method comprising steps for:

A) receiving a frequency deviation value and a number of levels in the inputted multiple level data signal;

B) determining, based at least in part on the frequency deviation value and the reference frequency signal, a maximum rate of enabling the adjusting means;

C) determining a deviation ratio corresponding to each level in the inputted multiple level data signal to produce a plurality of deviation ratios;

D) multiplying the maximum rate of enabling with each of the plurality of deviation ratios to produce a plurality of increment values, wherein each of the plurality of increment values is associated with a corresponding level in the inputted multiple level data signal;

E) detecting a data value for each level of the inputted multiple level data signal;

F) upon detection of a negative data value, inputting, to a first accumulator in the signal processor, an increment value associated with the corresponding level that produced the negative data value and testing the first accumulator to determine whether a first predetermined value is exceeded;

G) upon detection of a positive data value, inputting, to a second accumulator in the signal processor, an increment value associated with the corresponding level that produced the positive data value and testing the second accumulator to determine whether a second predetermined value is exceeded;

H) when the first predetermined value is exceeded, subtracting the first predetermined value from the first accumulator and subtracting, using the adjusting means, a signal pulse from the reference frequency signal to produce the modulated reference frequency signal; and I) when the second predetermined value is exceeded, subtracting the second predetermined value from the second accumulator and adding, using the adjusting means, the signal pulse to the reference frequency signal to produce the modulated reference frequency signal.

* * * * *